(12) United States Patent
Yang et al.

(10) Patent No.: US 6,403,711 B1
(45) Date of Patent: Jun. 11, 2002

(54) POLYSILOXANE HAVING A COPOLYMER DISPERSED THEREIN AND SEALANTS CONTAINING THE SAME

(75) Inventors: Wei-Yeih Yang, Brecksville; Melvin Dale Beers, Aurora; Ta-Min Feng, Hudson, all of OH (US)

(73) Assignee: Noveon IP Holdings Corp., Cleveland, OH (US)

( * ) Notice: Subject to any disclaimer, the term of this patent is extended or adjusted under 35 U.S.C. 154(b) by 0 days.

(21) Appl. No.: 09/480,766

(22) Filed: Jan. 10, 2000

Related U.S. Application Data

(63) Continuation of application No. 08/993,911, filed on Dec. 18, 1997, now abandoned.

(51) Int. Cl.[7] .................................................. C08G 2/14
(52) U.S. Cl. ........................ 525/100; 428/447; 524/731; 524/853; 524/852; 524/849; 524/863; 524/864; 524/775; 524/776
(58) Field of Search ................................ 525/100, 102; 524/731, 853, 852, 849, 863, 864, 775, 776; 428/447

(56) References Cited

U.S. PATENT DOCUMENTS

| | | | |
|---|---|---|---|
| 3,110,695 A | 11/1963 | Ceresa | 260/45.5 |
| 3,435,014 A | 3/1969 | Scherf et al. | 260/89.5 |
| 3,555,109 A | 1/1971 | Getson | 260/825 |
| 3,627,836 A | 12/1971 | Getson | 260/825 |
| 3,714,287 A | 1/1973 | Campbell et al. | 260/826 |
| 4,123,472 A | 10/1978 | Getson et al. | 260/827 |
| 4,138,387 A | 2/1979 | Bluestein | 260/42.26 |
| 4,208,471 A | 6/1980 | Bresak et al. | 428/447 |
| 4,211,729 A | 7/1980 | Marquardt et al. | 525/106 |
| 4,412,039 A | 10/1983 | Alberts et al. | 525/106 |
| 4,515,932 A | 5/1985 | Chung | 528/16 |
| 4,593,068 A | 6/1986 | Hirose et al. | 525/100 |
| 4,600,657 A | 7/1986 | Wegehaupt et al. | 428/447 |
| 4,618,656 A | 10/1986 | Kawakubo et al. | 525/404 |
| 4,725,648 A | 2/1988 | Fujimoto et al. | 525/100 |
| 4,861,831 A | 8/1989 | Damrath et al. | 525/100 |
| 4,904,761 A | 2/1990 | Okitsu et al. | 523/435 |
| 5,154,974 A | 10/1992 | Norman et al. | 428/355 |
| 5,296,569 A | 3/1994 | Noda et al. | 525/445 |
| 5,328,966 A | 7/1994 | Nagaoka | 525/476 |
| 5,457,148 A | 10/1995 | Lucas | 524/731 |
| 5,530,063 A * | 6/1996 | Nagai et al. | 525/101 |
| 5,618,877 A | 4/1997 | Tomlin et al. | 524/558 |

FOREIGN PATENT DOCUMENTS

| | | |
|---|---|---|
| DE | 2720534 | 11/1978 |
| EP | 0045906 | 2/1982 |

* cited by examiner

*Primary Examiner*—Margaret G. Moore
(74) *Attorney, Agent, or Firm*—Thoburn T. Dunlap; Valerie L. Calloway; Hudak & Shunk Co., L.P.A.

(57) ABSTRACT

A high elongation, low 100% modulus composition comprises a copolymer dispersed in a continuous phase polysiloxane. The copolymer is made from high amounts of at least a monomer which is capable of forming a low Tg polymer and relatively low amounts of at least a monomer which is capable of forming a high Tg polymer. The monomer forming the low Tg polymer can be an alkyl acrylate whereas the monomers forming the high Tg polymer can be a vinyl ester, an acrylonitrile or derivatives thereof, a vinyl substituted aromatic such as styrene, an alkyl methacrylate, and the like. The composition has good adhesion to substrates as well as good viscosity aging, and can be utilized in caulks or sealants.

38 Claims, No Drawings

POLYSILOXANE HAVING A COPOLYMER DISPERSED THEREIN AND SEALANTS CONTAINING THE SAME

CROSS REFERENCE TO RELATED APPLICATION

This application is a continuation application of U.S. application Ser. No. 08/993,911, which was filed on Dec. 18, 1997 and which is now abandoned.

FIELD OF THE INVENTION

The present invention relates to a low temperature flexible, water-repellant polysiloxane containing copolymer particles dispersed therein. More specifically, the present invention relates to the copolymer particles being formed in situ by polymerizing at least two different types of monomers in the polysiloxane which is curable at low temperatures; for example, an ambient temperature, upon exposure to moisture. Cured sealants containing the copolymer-polysiloxane have high elongation properties.

BACKGROUND OF THE INVENTION

Curable polyorganosiloxane, also known as silicone compositions have been used as sealants, caulks, adhesives, and in other similar applications because of their excellent water repellency, good adhesion, chemical and biological inertness, and good weather resistance. Such compositions generally contain a reactive polyorganosiloxane, crosslinking agents, and crosslinking catalysts. Polyorganosiloxane compositions are, however, relatively expensive and do not always provide satisfactory physical properties such as toughness and strength. In order to improve the physical properties of polyorganosiloxane compositions, various inorganic filler materials such as silica, diatomaceous earth, calcium carbonate, iron oxide and the like have been added. The use of such additives, however, has often resulted in an undesirably high viscosity which adversely affects the ease of application of the composition. In order to reduce the viscosity of filled polyorganosiloxane compositions to an acceptable level, organic solvents or non-reactive organosiloxanes can be used. However, this can result in undesirable shrinkage, or the release of environmentally undesirable organic components into the atmosphere or staining problems due to the non-reactive siloxane extrudate.

U.S. Pat. No. 4,138,387 to Bluestein relates to a polyolefin filled-organo polysiloxane composition which are allegedly stable dispersions comprised of a continuous phase of essentially ungrafted organo polysiloxane and a discontinuous phase of finely divided solid particles of a homopolymer or copolymer prepared from an organic monomer or monomers. The composition, however, is generally unacceptable as a sealant inasmuch as it has low elongation such as a maximum of only about 190 percent.

SUMMARY OF THE INVENTION

Curable dispersed copolymer-polysiloxane compositions are prepared by the in situ free radical polymerization in a polysiloxane fluid of at least two different classes of monomers, e.g. a first class of monomers which are capable of forming a polymer having a low Tg and a second class of monomers which are capable of forming a polymer having a high Tg. The copolymer, which can be either a thermoplastic or a thermoset, is generally a dispersed phase in the form of particles, the surface thereof generally having substantially high Tg polymers. The use of small amounts of a thixotrope renders the dispersed copolymer polysiloxane composition non-slump. The composition is generally viscous and is moisture curable. Utilization of the two different classes of monomers yields synergistic results upon cure in that the dispersed copolymer-polysiloxane composition has very high elongation as well as a 100% modulus of less than 50 psi. The composition also exhibits good flexibility and excellent weathering. Unlike previous reinforcing filler technology, the in situ polymerized particles have the unique characteristics of both reinforcing (strengthening) as well as plasticizing (increasing elasticity) the cured silicone network. Another attribute of the composition of the present invention is that they have good viscosity aging resistance before cure. Accordingly, the composition is suitable for use as a binder in caulks and sealants.

DETAILED DESCRIPTION OF THE INVENTION COPOLYMER-POLYSILOXANE

The dispersed copolymer-polysiloxane compositions of the present invention are generally made by reacting two or more different monomers in the presence of a polysiloxane fluid. The polysiloxane fluid generally contain a total of two or more reactive functional groups on the polymer chain, preferably at the terminal portion thereof.

The polysiloxane fluid desirably is an organo polysiloxane of the formula

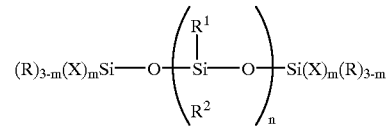

where $R^1$ and $R^2$, independently, is an alkyl having from 1 to 8 carbon atoms, desirably from 1 to 4 carbon atoms with methyl being preferred, or is an aromatic group or substituted aromatic group having from 6 to 10 carbon atoms with phenyl being preferred, and "n" is such that the weight average molecular weight of the polysiloxane is from about 2,000 to about 200,000 and desirably from about 15,000 to about 80,000 grams/mole. It is to be understood that the above polymers also contain, as noted above, two or more reactive functional groups (X) therein. The functional groups, independently, can be OH, or $OR^3$, or $N(R^4)_2$, or

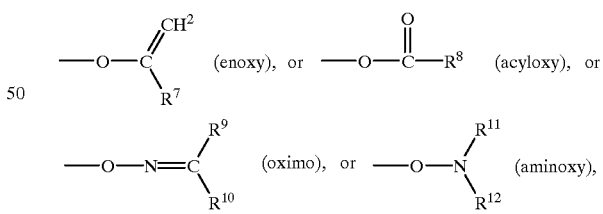

or an

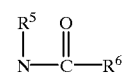

group, where $R^3$ through $R^{12}$, are, independently, an alkyl having from about 1 to about 8 carbon atoms. The amount of the functional groups, i.e. m, is 1, 2, or 3. The one or more R groups, independently, is an alkyl having from 1 to 8 carbon atoms or an aromatic or an alkyl-aromatic having from 6 to 20 carbon atoms and optionally containing one or more functional groups thereon such as amine, hydroxyl, etc. A polysiloxane fluid can furthermore contain a blend of two or more different polysiloxanes and/or polysiloxanes having different viscosities. The polysiloxanes are generally a viscous liquid and are commercially available, e.g. Masil® SFR 6,000 from PPG Corporation and Wacker 6LV from Wacker Corporation.

The organopolysiloxane fluid generally constitutes a reactive continuous phase containing a discontinuous phase therein which comprises copolymer particles made in situ by free radical polymerization. Desirably, two or more, and preferably two types of monomers are utilized wherein one, if homopolymerized, forms a low Tg polymer and the other, if homopolymerized, forms a high Tg polymer. As noted above, the copolymer can either be a thermoplastic, or if crosslinked, a thermoset.

The one or more monomers utilized which otherwise would form a polymer having a low Tg, i.e. generally from about −70° C. to about 0° C. and desirably from about −55° C. to about −10° C., include the various alkyl acrylates, and the like. The alkyl acrylate monomers generally have an alkyl portion which contains from 1 to 18 carbon atoms, and desirably from 1 to 8 carbon atoms. Examples of such suitable acrylates include methyl acrylate, ethyl acrylate, propyl acrylate, isopropyl acrylate, n-butyl acrylate, isobutyl acrylate, 1-ethyl propyl acrylate, 1-methyl pentyl acrylate, pentyl acrylate, hexyl acrylate, 2-ethylhexly acrylate, and the like, with n-butyl acrylate being highly preferred. A small amount of approximately 20 percent or less and desirably from about 2 to 8 percent by weight of the various alkyl acrylates can contain functional groups thereon. Such groups include hydroxyl, epoxy, acetoacetyl, acrylamide, and the like, are preferably terminal groups and serve to improve adhesion to various substrates such as metals, concrete, wood, etc.

One or more monomers are also utilized which otherwise would form a polymer having a high Tg, i.e. generally from about 1° C. or 5° C. to about 150° C. and desirably from about 20° C. to about 120° C. Such monomers include vinyl esters, acrylonitrile or derivatives thereof, vinyl substitute aromatics, alkyl methacrylates, vinyl chloride, vinylidene chloride, and the like. The non-vinyl portion of the vinyl ester generally contains a total of from 2 to about 10 carbon atoms, desirably from about 2 to about 8 carbon atoms with acetate, i.e. vinyl acetate, being highly preferred. With respect to the acrylonitrile monomers, while the same is generally utilized, alkyl derivatives thereof containing from 1 to about 6 carbon atoms such as methyl acrylonitrile, ethyl acrylonitrile, etc. can also be utilized. The vinyl substituted aromatics generally contain from 8 to about 12 carbon atoms and specific examples include styrene, alpha-methyl styrene, vinyl toluene, and the like. The alkyl methacrylates include monomers wherein the alkyl group contains from 1 to 18 carbon atoms, and desirably from 1 to 8 carbon atoms. Specific examples include methyl methacrylate, ethyl methacrylate, propyl methacrylate, isopropyl methacrylate, n-butyl methacrylate, ethyl hexyl methacrylate and the like, with methyl methacrylate, being preferred. Of the various one or more monomers which are capable of forming a polymer having a high Tg, the vinyl esters are preferred, such as vinyl acetate inasmuch as it has a reactive ratio with the various acrylate monomers such that a large portion of the vinyl acetate monomers polymerize after the various acrylate monomers have polymerized.

The copolymer particles are generally formed by polymerization at the same time, for example, simultaneously, the low Tg polymer forming monomers and the high Tg polymer forming monomers in the presence of the organopolysiloxane fluid. The type of copolymer will generally depend upon the reactivity ratios of the particular monomers. Reactivity ratios are defined in the Polymer Handbook, second edition, by J. Brandrup and E. H. Immergut, editors, 1975. If the amount and reactivity ratios of the monomers is decidedly different, the copolymers formed will initially be rich in the more reactive monomer until the more reactive monomer is consumed. Then the resulting copolymer portion formed will subsequently or terminally be rich in the less reactive monomer. If the reactivity ratios are similar, a random copolymer will generally be formed. Moreover, if the high Tg polymer forming monomer has a reactivity ratio similar to that of the low Tg polymer forming monomer, it is then desirable to add a large portion of the high Tg polymer forming monomer in a second or subsequent stage so that the copolymer particles be surface rich in the high Tg polymer. During the formation of the copolymers, small amounts of low Tg homopolymer and of high Tg homopolymer will also be formed. The weight of high Tg polymer forming monomers can vary from about 2.5 percent to about 50 percent and desirably from about 20 percent to about 40 percent by weight (based upon the total weight of monomers, i.e. high and low forming the copolymer particles).

Although a majority of the repeat units in the copolymer will be derived from low Tg monomers, desirably the copolymer particles have a majority or are phase rich on the surface thereof with repeat units in the copolymer and/or homopolymers derived from high Tg monomers. One manner of forming such particles is to add a significant amount such as from about 50 to about 100 percent by weight (i.e. from about one-half to all) of high Tg forming monomers during a late stage or a second stage of the polymerization. By late stage or second stage polymerization it is meant that some or most of the high Tg forming monomers are added after a certain or specified amount, for example, at least about 60 percent, desirably at least about 70 percent, and preferably at least about 80 percent of the previously added monomers (e.g. mostly low Tg forming monomers) have been polymerized.

Regardless of the monomer weight ratio, it is generally thought that the surface composition of the dispersed thermoplastic copolymer particles, have a high Tg, e.g. greater than about 5° C. and preferably greater than about 20° C. Otherwise viscosity aging sensitivity would often render the polysiloxane composition generally unsuitable for non-slump sealant applications. Whether the surface Tg of the copolymer particles have a desired high Tg can be determined by the use of various methods or apparatus such as by atomic force microscopy, through the use of solid state nuclear magnetic resonance or through ESCA, i.e. electron spectroscopy for chemical analysis.

Moreover, it has also been found that the interior of the dispersed copolymer particles should not exceed a Tg of zero degrees centigrade and desirably not above minus 10° C. Thus, the dispersed phase contains copolymer particles predominantly having high Tg polymers on the surface thereof and low Tg polymers in the interior thereof. The surface of the particles need not contain solely the high Tg polymer thereon and the same may exist as a partial coating, as particles, aggregates, etc., thereon, and the like. Moreover, the dispersed phase will at times contain small amounts of the organopolysiloxane or grafted polyorganosiloxane therein. Conversely, the continuous organopolysiloxane phase can contain some high and/or low Tg polymer-grafted polysiloxanes therein.

The shape of the dispersed copolymer particles can vary but generally is spherical or nearly spherical with the size thereof ranging from about 5 or 10 microns up to about 50, 30, or 20 microns in diameter. The size distribution of the dispersed particles is usually not monodisperse.

The weight percent of the discontinuous phase, i.e. the phase containing substantially copolymers, e.g. copolymers derived from one or more high Tg forming monomers, and one or more low Tg forming monomers is from about 10 or 20 to about 85 percent and preferably from about 50 to about 75 percent by weight based upon the total weight of the discontinuous phase and the continuous polysiloxane phase.

The utilization of the dispersed copolymer particles having a surface Tg of at least 5° C. and preferably at least 20° C. and a lower Tg interior in a polysiloxane fluid unexpectedly yields a composition which has good viscosity aging resistant properties. That is, upon standing at ambient temperature, the viscosity increase of the dispersed copolymer-polysiloxane composition before cure is little or small. Thus, the compositions do not have a viscosity increase such that they become an elastic material. Suitable viscosity aging properties include an increase of viscosity of generally less than 100%, desirably less than 50%, and preferably less than 25%, after aging for 24 hours at ambient temperature, i.e. 20° C., in accordance with ASTM D2452-75.

The dispersed copolymer-polysiloxane composition of the present invention also has unexpectedly been found upon cure to yield high elongations at break, such as at least 300 percent or 400 percent, desirably at least 500 or 600 percent, and preferably at least 700 or 800 percent up to about 1,100 percent at 20° C. Moreover, the 100% tensile strength modulus is from about 10 to about 50 psi.

The copolymer forming monomers are polymerized in the presence of a free radical initiator. Desirably, various initiators are utilized which are soluble in the monomers such as azo and desirably organic peroxide initiators. Examples of suitable organic peroxides include benzoyl peroxide, 2,4-dichlorobenzoyl peroxide, dialkyl peroxides such as di-tertiary-butyl peroxide and dicumyl peroxide; hydroperoxide and decylene hydroperoxide; cyclic peroxides such as 1,5-dimethylhexane-1,5-peroxide; peresters such tert-butylperbenzoate, tert-butyl-peroxy isopropyl carbonate, tert-butylperoctyate and tert-butylperacetate. Examples of azo compounds include azobisisobutyronitrile, 2,2-azobis-2,4-dimethylvaleronitrile, 2-carbamoyl, azoisobutylonitrile, dimethyl-2,2'-azobisisobutylate and 1,1-azobiscyclohexane carbonitrile. Generally, various persulfates are not utilized inasmuch as they are aqueous catalysts and are not soluble in the copolymer forming monomers of the present invention. The amount of the initiators is generally from about 0.05 to about 5.0 parts by weight for every 100 parts by weight of all of the low Tg and high Tg polymer forming monomers.

The polymerization temperature will vary depending upon the particular monomers utilized, but generally is from about 60° C. to about 130° C. and preferably from about 70° C. to about 100° C. in order to insure a quick reaction.

The actual in situ polymerization of the copolymer can proceed in any desired manner. A preferred mode of polymerization involves adding an organo polysiloxane to a reaction vessel which is free of oxygen, e.g. a nitrogen atmosphere. A mixture of the two or more monomers with at least one monomer capable of forming a low Tg polymer and a different monomer capable of forming a high Tg polymer, as well as initiators, are metered into the reaction system which has previously been heated to the polymerization temperature. Polymerization then occurs with the contents of the reaction vessel being mixed utilizing any conventional mixing device so that the formed copolymer particles are dispersed as a separate phase within the polysiloxane which exists generally as a continuous phase. Polymerization as well as the addition of monomers thereto is continued until a suitable amount of dispersed copolymer particles have been formed.

Optionally, one or more crosslinking compounds having more than one polymerizable unsaturated olefinic groups such as divinyl benzene, allylmethacrylate, and the like, in amounts of up to 5 parts by weight, desirably from about 0.1 to 2 parts by weight, and preferably from about 0.1 to 0.5 parts by weight for every 100 parts by weight of the copolymer forming monomers can be used, provided that severely agglomerated or irregularly shaped particles are not formed in amounts sufficient to render the dispersion too viscous or unstable.

Another important aspect of the present invention is the utilization of low amounts of a thixotropic agent such as generally less than 3 parts by weight, desirably from about 0.05 to about 2 parts by weight, and preferably from about 0.05 to about 0.5 parts by weight per 100 parts by weight of the dispersed copolymer-polysiloxane composition. Examples of suitable thixotropic agents include hydrogenated castor oil, fumed silica, precipitated calcium carbonate, and the like. The above-noted amounts of thixotropic agents result in a non-slump composition, i.e. non-sagging in vertical joints as measured by ASTM D 2202-938.

The dispersed copolymer-polysiloxane compositions of the present invention, are cured by generally subjecting them to moisture. Either a conventional one-component or two-component cure system can be utilized. In a conventional one-component cure, the polysiloxane is converted to a compound having an alkoxy, an oxime, an enoxy, an amido, an amino, or an acetoxy blocking group in a manner well known to the art and to the literature. Conventional condensation catalysts are utilized such as an organo tin, for example, dibutyltin diacetate, dibutyltin dilaurate, or dimethylhydroxytin oleate, or an organo titanate. Optionally, the blocked one-component cure system can contain crosslinking agents as set forth herein below. In a two-component cure system, crosslinking agents such as a multi-functional alkoxy silane or oligomers thereof and catalysts are kept separate from the polysiloxane until reaction. The amount of catalyst for the two component system, is generally much higher than in the one component system. Such cure systems are well known to the art, e.g. see Rubber Technology, 3rd Edition, pp. 406–07, 1987, by Maurice Morton, Van Nostrand Reinhold, which is hereby fully incorporated by reference.

While a variety of conventional crosslinkers are suitable, oxime crosslinkers are preferred, such as for example, vinyl tris-methylethylketoximosilane, and methyltris-methylethylketoximosilane. Methyltris-methylethylketoximosilane (MOS) is available under the trade name OS-1000 from Allied Signal Corp. Other crosslinkers are also suitable; such as for example, alkoxysilanes, epoxyalkylalkoxysilanes, amido silanes, aminosilanes, enoxysilanes and the like, such as tetraethoxysilanes, methyltrimethoxy silane, vinyl trimethoxysilane, glycidoxypropyltrimethoxsilane, vinyl tris-isopropenoxysilane, methyl tris-isopropenoxysilane, methyl tris-cyclohexylaminosilane, and methyl tris-secondarybutylaminosilane. Mixtures of crosslinkers can also be employed. The amount of the crosslinking agent is generally from about 0.2 to about 20 parts by weight, desirably from about 1 to about 10 parts by weight, and preferably from about 1.5 to about 6.5 parts by weight for every 100 parts by weight of said copolymer-polysiloxane.

Another important aspect of the present invention is that various compatibilizing agents are optionally utilized to generally form a thin layer which compatibilizes the generally otherwise incompatible polysiloxane with a dispersed high Tg-low Tg polymer phase and thus helps control the particle size, improve tensile strength properties, and result in lower dispersion viscosities. Suitable compatibilizing agents include vinyl containing or mercapto containing polyorganosiloxanes, or macromonomers such as monomethacryloxypropyl terminated polydimethylsiloxane, and the like, with vinyl terminated polydimethyl siloxane such as PS443 from United Chemical Technologies, Inc. being preferred. The amount of the optional compatibilizing agents are generally up to about 15 parts by weight, and desirably from about 1 to about 5 parts by weight for every 100 parts by weight of the high and low Tg polymer forming monomers.

The dispersed copolymer-polysiloxane composition generally has a low viscosity which permits it to be readily extruded. Thus, the copolymer-polysiloxane can be used in low temperature applications. Upon exposure to moisture, the composition cures and forms a low temperature flexible, water repellant, thermal oxidative resistant, UV resistant material. The composition also upon cure has low shrinkage and is soft and pliable. Unexpectedly, the dispersed copolymer-polysiloxane composition has synergistic elongation properties at break as noted above of from about 300 to about 1,100 percent and yet has low 100% tensile modulus properties, the combination of which is highly desired for sealant properties. These properties were unexpected inasmuch as polysiloxane compositions made from only low Tg forming monomer(s) or from only high Tg forming monomer(s) such as those contained in conventional silicone sealants generally had low elongations, typically less than 300 percent.

Sealant

Sealant compositions which are particularly useful as caulks, are comprised of the dispersed copolymer-polysiloxane, one or more of the above noted crosslinkers, and optionally though preferably: an adhesion promoter; a reinforcing agent; a chain extender; and a plasticizer. The sealants in their uncured states have little sag, generally less than about 1.0 inches, desirably less than about 0.5 inches, preferably less than about 0.2 inches, most preferably about 0. The uncured sealants are easy to tool and have a tooling life of from about 5 to about 240, desirably from about 10 to about 180, and preferably from about 20 to about 150 minutes. Once the sealant cure is initiated, the sealants become tack free in generally about 0.5 to about 12 hours, desirably from about 1 to about 8 hours, and preferably from about 1.5 to about 7 hours. The sealants become substantially cured, i.e. chemically crosslinked, in about 7 days although this may vary depending upon the curing system, particularly the catalyst employed. The sealants are typically completely cured at about 21 days at 25° C. and 50% relative humidity.

The cured sealant has a shore A hardness generally from about 3 to about 45, desirably from about 8 to about 35, and preferably from about 10 to about 25; a tensile strength generally from about 20 to about 400, desirably from about 50 to about 300, and preferably from about 60 to about 200 psi; an elongation to break of generally from about 250 to about 1600, desirably from about 350 to about 1400, and preferably from about 400 to about 1200 percent; and a 100% extension modulus of generally from about 8 to about 130 psi, desirably from about 10 to about 100 psi, preferably from about 10 to about 50 psi, and most preferably from about 15 to about 35 psi. The extension modulus is measured according to ASTM D412 at 100% elongation.

The amount of the adhesion promoter in the sealing composition is generally from 0 to about 15, desirably from about 0.3 to about 15, preferably from about 0.75 to about 6, and more preferably from about 1 to about 3 parts by weight based upon 100 parts by weight of the copolymer and polysiloxane. The amount of the reinforcing agent is generally from 0 to about 100, desirably from about 0.1 to about 100, preferably from about 0.1 to about 60, and more preferably from about 0.2 to about 30 parts by weight based upon 100 parts by weight of the copolymer and the polysiloxane. The amount of the plasticizer is from 0 to about 80, desirably from about 5 to about 80, and preferably from about 10 to about 30 parts by weight based upon 100 parts by weight of the copolymer and the polysiloxane. The amount of the chain extender is generally from 0 to about 12, desirably from about 0.2 to about 12, preferably from about 0.2 to about 8, and more preferably from about 0.5 to about 5 parts by weight based upon 100 parts weight of the polysiloxane.

The plasticizer contributes to the flexibility, particularly low temperature flexibility, of the cured sealant. Unexpectedly, the addition of the plasticizer unlike conventional polysiloxanes which result in reduced tensile strength, imparts improved tensile strength to the copolymer-polysiloxane admixture. The plasticizer also modifies the modulus of the cured sealant; if modulus values exceed about 100 psi at 100% extension, the cured sealant tends to pull the surface of the material, particularly materials like concrete, to which the sealant is applied. The modulus values of the cured sealant are preferably less than about 60 psi, more preferably less than about 40 psi.

The plasticizer generally has a number average molecular weight of from about 100 to about 800 and desirably from about 200 to about 400. Preferably the plasticizer has a boiling point greater than about 100° C., at 1 atmospheric pressure. Suitable plasticizers are phthalate esters, dibenezoate esters, phosphate esters, and adipate esters. Examples of phthalate esters are dibutyl phthalate, dioctyl phthalate, dimethyl phthalate, diisodecyl phthalate, butyl benzyl phthalate, texanol benzyl phthalate, $C_7$ benzyl phthalate, and $C_9$ benzyl phthalate. Examples of dibenzoate esters are dipropylene glycol dibenzoate, polypropylene gylcol dibenzoate, diethylene glycol, and triethylene glycol dibenzoate. Examples of adipate esters are dioctyl adipate, ditridecyl adipate, and dialkyl adipate. Examples of phosphate esters are tricryesyl phosphate, trioctyl phosphate, triphenyl phosphate, and t-butylphenyl diphenyl phosphate. Other suitable plasticizers are for example terephthalates such as 1,4-benzenedicarboxylates, and trimelliatics such as 1,2,4-benzenedicarboxylates;. A suitable butyl benzyl phthalate, a phthalate ester of butyl alcohol and benzyl alcohol, is commercially available as Santicizer 160 formerly from Monsanto Solution Company, St. Louis, Mo., now Solutia St. Louis, Mo.

The chain extenders are difunctional molecules which extend the length of the polysiloxane polymer chains and modify the modulus of elongation of the cured sealant. Suitable classes of chain extenders are silane chain extenders such as amino silanes, amido silanes, acetoxy silanes, and aminoxy silanes. Suitable chain extenders are for example, methylvinyl bis-N,-methylacetamidosilane, methylhydrogendiacetoxysilane, dimethylbis-diethylhydroxylaminosilane and dimethylbis-secondarybutylaminosilane. Dimethylbis-secondary butylaminosilane is available under the trade name SB-72 from Wacker Silicones of Adrian, Mich.

The adhesion promoter, although optional, is highly preferred; the adhesion promoter provides the sealant with long term adhesion to the substrate. Suitable classes of adhesion promoters are aminoalkyl, mercaptoalkyl, epoxyalkyl, ureidoalkyl, carboxy, acrylate and isocyanurate functional silanes. Examples of suitable adhesion promoters are mercaptopropyltrimethoxysilane, glycidoxpropyltrimethoxysilane, aminopropyltriethoxysilane, aminoethylaminopropyltrimethoxysilane, ureidopropyltrimethyloxysilane, bis-γ-trimethoxysilyl-propylurea, 1,3,5-tris-γ-trimethoxysilylpropylisocyanurate, bis-γ-trimethoxysilylpropylmaleate and fumarate and γ-methacryloxypropyltrimethoxysilane A suitable silane adhesion promoter is aminopropyltriethoxysilane which is available under the trade designation A-1100 Silane from OSi, a division of Witco Corporation.

The reinforcing agents are optional although highly preferred, particularly when the sealant is used as a caulk. Reinforcing agents increase tensile strength in the cured sealant and reduce sag of the uncured sealant. The reinforcing agent also functions as a thixotrope. Such reinforcing agents are finely divided particulates and include both the conventionally known reinforcing agents and semi-reinforcing agents, typically having a particle size less than about 10 microns, preferably about 5 microns or less, more preferably about 0.1 microns or less. Suitable reinforcing agents include hydrophobic treated fumed silicas, such as TS 720 from Cabot Corporation, or R-972 from Degussa Corporation, hydrophobic precipitated calcium carbonates, talc, zinc oxides, and polyvinyl chloride powders. Other ingredients can also be utilized in the sealant formulation in amounts up to about 20 parts by weight and desirably from about 0.01 to about 15 parts by weight per 100 parts by weight of the copolymer and the polysiloxane. Such ingredients include fungicides. Moreover, extender fillers such as ground calcium carbonates and diatomaceous earth are optionally employed. Such extenders have minimal or no reinforcing effect and/or minimal or no thixotropic effect.

UV stabilizers can be optionally added. Pigments or colorants such as titanium dioxide, iron oxide, carbon black are optionally employed to impart color to the sealant and/or to act as ultraviolet stabilizer. LTV inhibitors, anitozonates are also optionally added.

The sealant in its uncured state may optionally contain solvents such as organic solvents to reduce the viscosity; such solvents are employed where the sealant is to be used as a coating such as for a roof. Such solvents are less preferred where the sealant is to be used as a caulk since as such solvents evaporate, the cured sealant shrinks which is not desirable.

The present invention relates to a family of silicone sealants which generally meet all of the performance features demanded by the construction industry for joint and general sealing such as; non-staining characteristics on porous substrates like white marble, virtually no change of properties during weather exposure, low modulus elastomeric behavior to accommodate joint movement without adhesive or cohesive failure, extended tooling life which allows a worker to apply the sealant in long joints before having to tool the surface of the sealant and primerless adhesion to a broad spectrum of substrates such as anodized aluminum, concrete, brick, mortar, marble, granite, limestone, porcelain, glass, painted surfaces, wood, PVC, polyacrylate, polycarbonate, and polystyrene, etc.

Unlike conventional silicone sealants wherein the tooling time generally ranges from about 2 to about 30 minutes and even less at elevated temperatures and humidities, for example, from about 1 to about 10 minutes, the copolymer-silicone sealants of the present invention can generally have tooling times in excess of 2 hours. As noted above, the copolymer-silicone sealant compositions of the present invention have good low modulus characteristics such as low as 10 to 20 PSI at 100 percent extension. Conventional silicone sealants generally do not have such a high elongation with extreme low modulus and can fail on weak tensile stress surfaces such as concrete.

With proper compounding, the copolymer-polysiloxane compositions of the present invention can also be used to coat fabrics, or to form gaskets. Another large area of utility is as silicone alloys, including thermoset alloys such as RTV (room temperature vulcanizable) silicone-acrylate alloys, molded silicone rubbers, and silicone-acrylate epoxy additives wherein the silicone can be the copolymer-polysiloxane composition of the present invention or it can be a mixture or blend of a conventional silicone and the copolymer-polysiloxane composition of the present invention. The composition of the present invention can also be used in medical applications, electronic applications, automotive applications, textile applications, paper coatings, polishes, cosmetic applications, pharmaceutical applications and as processing aids.

EXAMPLES

Polymerization Set-Up

The reactor used for polymerization was a 5-neck jacketed 2 liter resin kettle, fitted with a mechanical stirrer, a condenser, a nitrogen-inlet, a vacuum port and a safety release valve.

The monomer/initiator mixture was stored in a graduated cylinder, which was refrigerated and was kept under a gentle nitrogen sweep. The feeding was done from the bottom of the reactor and the rate of which was controlled by a metering pump.

To heat the reactor to the desired temperature, a knife-heater was installed in the circulation loop of polysiloxane (non-reactive) fluid, which was pumped to flow through the jacket of the reactor. A temperature-control-console monitored the temperature of the thermocouple located at the bottom of the reactor and controlled the timing of opening and closing of a diaphragm valve. The diaphragm valve was installed to control the flow of the cool polysiloxane fluid into the heating loop, such that the exotherm of the polymerization could be counteracted. Four additional temperature readouts updated the temperatures of reactor inlet, reactor outlet, monomer/initiator reservoir and polysiloxane bath. The thermo-couple inside the reactor was located at the bottom of the resin kettle about one-half inch below the monomer inlet.

The agitation was accomplished by specially designed blades, which have two two-leafed marine blades, about 3 inches apart along the stainless steel shaft and two sweeping blades which keep the material on the interior wall moving. In order to facilitate the mixing of the incoming monomer in the vicinity of the monomer inlet, two small slanted blades at the foot of each sweeping blade were also provided. The speed of stirring was controlled by a variable speed electric motor. The stirring speed and the torque exerted on the stirring shaft were constantly displayed by a digital readout.

General Polymerization Procedure

The weighed monomer/initiator mixture was poured into the refrigerated reservoir via a funnel. The contents were then kept under a nitrogen sweep.

The polysiloxane fluid was weighed and placed in the reactor. The stirring speed was set at 100 rpm. The reactor was evacuated to rid it of oxygen. Then, the inside temperature was brought to the desired polymerization temperature.

When the temperature was 75° C., the monomer/initiator was fed into the reactor via a metering pump according to a pre-determined rate.

After the monomer addition was completed, the temperature was raised to 90° C. and the polymerization continued for 2 hours.

The final phase of the polymerization was carried out by first injecting 0.02 phr of Lupersol 575 initiator to the reactor, raising the reactor temperature to 100° C., and then starting the vacuum stripping for 1 hour.

The residual monomer can be effectively reduced to very low levels, either by using a high temperature-activated initiator as part of the initiator package or by using a booster shot of initiators during the final phase of the polymerization. Vacuum stripping will aid the efficiency of monomer removal.

Utilizing the above procedures, polysiloxane compositions were produced from the recipes set forth in Table I, wherein the parts are by weight.

After the copolymer-polysiloxane composition is made, various amounts of a thixotrope, i.e. TS 720 (fumed silica) from Cabot Corporation are added thereto. The data set forth in Table II is with regard to uncured properties with the exception of the tensile properties which relate to a cured copolymer-polysiloxane. These tensile properties were obtained after curing the copolymer-polysiloxane composition with 4 parts by weight of MOS per 100 parts by weight of the copolymer-polysiloxane composition in the presence of 0.08 parts by weight of dibutyltin dilaurate catalyst.

TABLE II

| | Ex. 1 | Ex. 2 | Ex. 3 | Ex. 4 | Ex. 5 | Ex. 6 |
|---|---|---|---|---|---|---|
| Thixotrope TS720 (phr) | 0.215 | 0.142 | 0.532 | 0.314 | 0.122 | 0.304 |
| Uncured Data Flow Rate: | | | | | | |
| (seconds to extrude 20 gms of polysiloxane composition) ASTM Test # D2452-75 Fresh Sample | | | | | | |
| @ 60 psi | 47 | 44 | 38 | 38 | 38 | 26 |
| @ 20 ps | 235 | 198 | 182 | 174 | 200 | 123 |
| 1 Day Aged Polysiloxane Composition | | | | | | |
| @ 60 psi | 215 | 51 | 38 | 41 | 39 | 87 |
| @ 20 ps | 1289 | 232 | 199 | 189 | 226 | 1401 |

TABLE I

| EXAMPLE | 1 | 2 | 3 | 4 | 5 | 6 |
|---|---|---|---|---|---|---|
| Polydimethylsiloxane (OH terminated) | | | | | | |
| Viscosity - Centistokes - 20,000 | 130 | 0 | 0 | 0 | 0 | 0 |
| Viscosity - Centistokes - 6,000 | 232 | 54.6 | 0 | 54.6 | 0 | 0 |
| Viscosity - Centistokes - 2,000 | 130 | 218.4 | 273 | 218.4 | 280 | 273 |
| n-Butylacrylate | 602 | 500 | 500 | 500 | 333.2 | 565 |
| Vinyl Acetate | 0 | 100 | 165 | 100 | 19.6 | 34 |
| Methyl Methacrylate | 66 | 65 | 0 | 65 | 39.2 | 66 |
| N-t-butylacrylamide | 0 | 3.2 | 3.2 | 3.2 | 2.35 | 0 |
| (Vinyl terminated)[a] compatibilizing polysiloxane | 0 | 13.4 | 13.4 | 13.4 | 0 | 13.4 |
| Lupersol 546 (t-amylperoxyneodecanoate) | 1.65 | 2.4 | 3.5 | 2.4 | 1.44 | 2.4 |
| Lupersol 575 (t-amylperoxy-2-ethylhexanoate) | 1.65 | 1.0 | 0 | 1.0 | 0.6 | 1.0 |
| Benzoyl peroxide | 0 | 0 | 1.0 | 0 | 0 | 0 |
| Second Stage: | | | | | | |
| n-Butylacrylate | — | — | — | — | 130.7 | — |
| Vinyl Acetate | — | — | — | — | 130.7 | — |
| N-t-butylacrylamide | — | — | — | — | 1.57 | — |
| Glycidyl methacrylate | — | — | — | 6.4 | — | — |
| Lupersol 546 | — | — | — | — | 0.96 | — |
| Lupersol 575 | — | — | — | — | 0.40 | — |
| Metering Rate | 2.5 hr | 2.5 hr | 2.5 hr | 2.5 hr | 2.5 hr | 2.5 hr |
| Polymerization condition | A | B | C | D | E | F |
| Scavenging Temperature | 110° C. | 110° C. | 110° C. | 110° C. | 110° C. | 110° C. |

[a]Vinyl terminated polysiloxane, i.e. PS 443, manufactured by United Technology.
A - 75° C. till 60% monomer added, raise to 90° C., then 2 hrs at 90° C.
B - 75° C. till 1 hr after monomer addition is done, raise to 90° C., then 90° C. for 1 hr.
C - 75° C. till 0.5 hr after monomer addition is done raise to 90° C., then 90° C. for 1.5 hr.
D - 75° C. till 1 hr after monomer addition is done, raise to 90° C., then 90° C. for 1 hr. When the first monomer feed is 90% completed, add the second monomer feed to the remaining monomer feed.
E - 80° C. till 0.5 hr after second monomer addition is done, raise to 90° C., then 90° C. for 1.5 hr. The second monomer feed starts as soon as after the first monomer feed is done.
F - 90° C. till 2 hrs after monomer addition is done.

TABLE II-continued

| Thixotrope TS720 (phr) | Ex. 1<br>0.215 | Ex. 2<br>0.142 | Ex. 3<br>0.532 | Ex. 4<br>0.314 | Ex. 5<br>0.122 | Ex. 6<br>0.304 |
|---|---|---|---|---|---|---|
| 1 Wk Aged Polysiloxane Composition | | | | | | |
| @ 60 psi | 780 | 49 | 44 | 40 | 36 | 969 |
| @ 20 psi | 4400 | 216 | 219 | 203 | 236 | 4200 |
| Cured Tensile: | | | | | | |
| Elongation % | 703 | 1050 | 701 | 1048 | 848 | 1012 |
| Modulus @ 100% (psi) | 26 | 20 | 20 | 22 | 24 | 17 |
| Strength @ Break (psi) | 116 | 168 | 153 | 224 | 168 | 138 |
| Uncured Viscosity Aging Sensitivity | yes | No | no | No | no | yes |

Although Table II relates to the use of a thixotrope, examples not utilizing a thixotrope resulted in similar uncured properties. As apparent from Table II, only Examples 1 and 6 resulted in poor viscosity aging. For example, the time to extrude 20 grams increased more than one order of magnitude for Examples 1 and 6 when aged one week, while Examples 2–5 only experienced slight increases in time to extrude 20 grams under the same aging conditions. Example 1 had poor viscosity aging inasmuch as no vinyl acetate, (i.e. a high Tg forming monomer) was utilized. In Examples 2–5, wherein vinyl acetate was utilized which yields a very high Tg polymer, and yet has a low reactivity ratio so that it is located generally on the surface of the particles, good viscosity aging properties were obtained. Although vinyl acetate was utilized in Example 6, the amount thereof is thought not to be sufficient to form a surface rich high Tg polymer on the copolymer particle. The amount of vinyl acetate in Example 5 can be distinguished from Example 6 because additional vinyl acetate was added in a second stage in Example 5.

In a similar manner, as set forth above, recipes 7 through 14 as set forth in Table III, were polymerized to form other polysiloxane compositions of the present invention.

TABLE III

| EXAMPLE | 7 | 8 | 9 | 10 | 11 | 12 | 13 | 14 |
|---|---|---|---|---|---|---|---|---|
| ethylsiloxane (OH terminated) | | | | | | | | |
| Viscosity - Centistokes - 20,000 | 0 | 0 | 0 | 0 | 0 | 0 | 57.6 | 64 |
| Viscosity - Centistokes - 6,000 | 320 | 320 | 320 | 240 | 240 | 0 | 144 | 160 |
| Viscosity - Centistokes - 2,000 | 0 | 0 | 0 | 0 | 0 | 320 | 86.4 | 96 |
| Masil SF10 - polydimethyl siloxane fluid from PPG | 0 | 0 | 0 | 0 | 0 | 0 | 32 | 0 |
| First Stage Polymerization | | | | | | | | |
| n-Butylacrylate | 560 | 590 | 590 | 326 | 326 | 0 | — | 558.9 |
| Vinyl Acetate | 0 | 0 | 0 | 0 | 0 | 31 | 31 | 0 |
| Methyl methacrylate | 0 | 0 | 0 | 0 | 0 | 0 | — | 62.1 |
| Glycidyl methacrylate | 0 | 0 | 0 | 0.3 | 0 | 0 | — | — |
| Methacrylic acid | 0 | 0 | 0 | 0.3 | 0 | 0 | — | 3.2 |
| Allyl methacrylate | 0 | 0 | 0 | 0 | 0.03 | 0 | — | — |
| N-i-butytacrylamide | 0 | 0 | 0 | 0 | 0 | 0 | | |
| Lupersol 546 | 1.40 | 1.48 | 1.48 | 0.6 | 0.6 | 0.15 | 0.15 | 1.60 |
| Lupersol 575 | 0 | 0 | 0 | 0 | 0 | 0 | — | — |
| Benzoyl peroxide | 1.40 | 1.48 | 1.48 | 0.6 | 0.6 | 0 | — | 1.45 |
| Pause Between Stages | 1 hr | 1 hr | 1 hr | 0 hr | 0 hr | 1 hr | 1 hr | |
| Second Stage Polymerization | | | | | | | | |
| n-Butylacrylate | 30 | 15 | 0 | 70 | 70 | 530 | 530 | 0 |
| Vinyl Acetate | 30 | 15 | 30 | 70 | 70 | 0 | 0 | 0 |
| Methyl methacrylate | 0 | 0 | 0 | 0 | — | 60 | 60 | 0 |
| N-t-butylacrylamide | — | — | — | — | 1.0 | 3.2 | 3.2 | 0 |
| Lupersol 546 | 0.15 | 0.10 | 0.10 | 0.25 | 0.25 | 1.45 | 1.45 | 0 |
| Benzoly peroxide | 0.15 | 0.10 | 0.10 | 0.25 | 0.25 | 1.45 | 1.45 | 0 |
| Metering rate | 2.5 hrs | 2.5 hrs | 2.5 hrs | 2.5 hrs | 2.5 hrs | 2.5 hrs | 2.5 hrs | 2.5 hrs |
| Polymerization condition | A | A | A | B | B | C | D | E |
| Scavenging Temperature | 110° C. | 110° C. | 110° C. | 110° C. | 110° C. | 110° C. | 110° C. | 110° C. |

A - 105° C. till first monomer addition is done, raise to 90° C., then 90° C. till 2 hrs after the second stage monomer feed is done.
B - 90° C. throughout two stages of monomer addition, then continue for 2 hrs at 90° C.
C - 75° C. during the first stage, raise to 90° C., then 90° C. till 2 hrs after the second stage monomer feed is done.
D - 90° C. throughout the monomer addition, then continue for 2 hrs.
E - 75° C. during the first monomer addition and the pause, raise to 90° C., then 90° C. till 2 hrs after the second stage monomer feed is done.
Scavaging procedure:
The final phase of the polymerization is carried out by first injecting 0.02 phr of Lupersol 575 to the reactor, raising the reactor temperature to 100–110° C., and then start vacuum stripping for 1 hour.

Compositions formed were tested with regard to viscosity aging sensitivity and the results thereof are set forth in Table IV. The flow rate and the viscosity aging sensitivity data relate to uncured compositions containing the copolymers dispersed in the polysiloxane whereas the tensile data relates to cured compositions which were cured in a manner identical to Table II.

polymer, to provide a dispersed copolymer-polysiloxane composition having 70% soft acrylate polymer and 30% silanol terminated dimethylpolysiloxane.

A dispersed copolymer-polysiloxane composition, Example 16, was prepared from the following ingredients.

TABLE IV

TWO STAGES POLYMERIZATION DATA AND VISCOSITY AGING SENSITIVITY

| EXAMPLE | 7 | 8 | 9 | 10 | 11 | 12 | 13 | 14 |
|---|---|---|---|---|---|---|---|---|
| Silanol Viscosity, cts | 6,000 | 6,000 | 6,000 | 6,000 | 6,000 | 2,000 | 5,492 | 5,492 |
| Polymerization stage | two | two | Two | two | Two | two | two | single |
| Thixotrop amount (phr) | HCO 0.15% | HCO 0.16% | HCO 0.31% | HCO 0.21% | HCO 0.15% | HCO 0.25% | TS720 0.05% | TS720 0.03% |
| Uncured Flow Rate: (seconds to extrude 20 gms) ASTM Test # D2452-75 | | | | | | | | |
| @ 60 psi | 59 | 52 | 50 | 68 | 66 | 26 | 45 | 59 |
| @ 20 psi | 400 | 293 | 303 | 409 | 472 | 123 | 234 | 254 |
| Cured Tensile: | | | | | | | | |
| Elongation % | 425 | 442 | 449 | 726 | 744 | 599 | 733 | 638 |
| Modulus @ 100% | 20 | 19 | 17 | 20 | 24 | 23 | 24 | 30 |
| Strength @ Break | 91 | 96 | 77 | 128 | 150 | 106 | 118 | 103 |
| Uncured Viscosity Aging Sensitivity | no | No | No | no | No | yes | yes | Yes |

Note: HCO = Hydrogenated Castor Oil

The Examples 7–11 compositions of Table III generally utilized a two stage polymerization wherein significant amounts of vinyl acetate was added in the second stage, thus generally resulting in a copolymer surface rich in a high Tg polymer. Examples, 12, 13, and 14 which did not utilize vinyl acetate in the second stage did not have good viscosity aging properties.

Example 15 relates to the use of a polysiloxane composition of the present invention, i.e. Example 2, which was utilized as an additive in an epoxy coating.

Example 15

| | Parts by Weight: |
|---|---|
| EPON 828 | 90 |
| Example 2 | 10 |
| MOS | 0.35 |
| Diethylene Triamine | 3.75 |
| N-aminoethyl piperazine | 11.0 |
| γ-aminopropyltriethoxysilane | 0.05 |
| TS 720 | 0.05 |

The above ingredients were thoroughly mixed and the cured at ambient temperature. The composition of Example 15 relates to an epoxy coating having improved toughness and water repellency. The epoxy coating can be applied to various substrates such as concrete, metal, wood, and the like.

Example 16

An acrylate terpolymer suspension was polymerized in the presence of a silanol terminated-dimethylpolysiloxane

| Ingredients | Total Weight | Weight Percent |
|---|---|---|
| 2450 cps Silanol Terminated Dimethylpolysiloxane | 300 grams | 29.83 |
| Vinyl Acetate | 102.2 | 10.16 |
| n-Butyl Acrylate | 517.6 | 51.47 |
| Methyl Methacrylate | 66.6 | 6.62 |
| N-t-Butyl Acrylamide | 3.3 | 0.33 |
| 1000 cps Vinyl Terminated Dimethylpolysiloxane Polymer | 13.7 | 1.36 |
| t-amyl Peroxyneodecanoate (546-M75) | 1.47 | 0.15 |
| t-amyl Peroxy-2-Ethylhexanoate (575-M75) | 0.84 | 0.084 |
| Total | 1005.713 | 100.00 |
| Chaser a | | |
| Lupersol 546-M75 | 1 | |
| Lupersol 575-M75 | 2 | |
| Chaser b | | |
| Lupersol 546-M75 | 1 | |
| Lupersol 575-M75 | 2 | |
| Chaser c | | |
| Lupersol 575-M75 | 2 | |

To a clean 2 liter reactor was added 240 g of 2000 cps reactive silanol terminated dimethylpolysiloxane and 60 g of 6000 cps reactive silicon polymer to yield a mixed silicone polymer solution having a viscosity of 2,450 cps. The speed was set to about 100 rpm; the reactor heated to about 80° C. and a vacuum was applied for about 30 minutes. Then, the vacuum was discontinued and the nitrogen gas started.

A monomer feed tank was charged with 102.2 g of vinyl acetate, 517.6 g of n-Butyl acrylate, 66.6 g of methyl methacrylate, 3.3 g of N-t-butyl acrylamide, and 13.7 g of vinyl terminated siloxane polymer to provide a first mixture.

Catalyst was charged to a container with 1.47 g of Lupersol 546-M75 and 0.84 g of Lupersol 546-M75 to provide a second mixture. Then the first and second mixtures were fed simultaneously to the reactor over a period of about three hours at about 80° C. Then the material was aged at 80° C. for 30 minutes; then chaser a was added, and the composition was aged for about 30 minutes. Next chaser b was added, and the temperature was raised to about 95° C., and the composition was aged for about 60 minutes. Next chaser c was added, the temperature was raised to about 110° C., and the composition was aged for about 60 minutes. Then vacuum was applied for about 30 minutes at about 110° C. and then the composition was cooled to about 75° C. with the vacuum on, and then the dispersed copolymer polysiloxane composition was discharged. The viscosity of the resulting dispersed copolymer polysiloxane composition was about 240,000 cps as measured on an HBT Brookfiled viscosometer using a number 6 spindle at 10 rpm.

Example 17

Example 17 was made as was Example 16, except that the N-t-butylacrylamide was not utilized.

Example 18

Formula (80/20) using 750 cps silicone polymer

| | Weight, gram | % |
|---|---|---|
| 1. Silicone Polymer | | |
| 750 cps silanol terminated polydimethylsiloxane | 246 | 0.20003 |
| 2. Acrylic Monomers | | |
| Vinyl acetate | 143 | 0.11628 |
| n-butyl acrylate | 725 | 0.58951 |
| Methyl methacrylate | 93 | 0.07562 |
| 1000 cps vinyl terminated polydimethylsiloxane | 19.2 | 0.01561 |
| 3. Initiators | | |
| 546-M75 | 2.06 | 0.00168 |
| 575-M75 | 1.57 | 0.00128 |
| TOTAL: | 1229.83 | 1.00000 |
| 4. Chaser | | | chaser a - 31 g Santicizer 160 and 1 g 575-M75
chaser b - 1 g 575-M75
Procedures Same as Example 16, except that this 80/20 formulation had 4 hour feed instead of 3 hour feed. In addition, the method of chaser is different as well. Here is the chasing method:
1. After 30 minutes 80° C. aging, add chaser a and then raise temp. to 95° C. and age for 60 min.
2. Add chaser b after 95° C. aging, and then raise temp. to 110° C.: age at 110° C. for 60 min. then vacuum for one hour.
Polymer Properties:

Viscosity = 344,000 cps; flow rate at 60 psi = 32.5 sec; particle size = 20–30 microns.
Cured Properties
(mixed with 4% MOS and 0.01% DBTDL)

1. Elongation = 350%. 100% modulus = 40 psi; tensile at break = 150 psi; hardness (Shore A) = 12.

Example 19

A sealant composition suitable for use as a caulk, was prepared using the following ingredients:

| Material | Total Charge Grams | Weight Percent |
|---|---|---|
| Example 16 (70% dispersed copolymer 30% polydimethylsiloxane composition) | 500 | 74.49 |
| Santicizer 160 plasticizer | 67 | 9.98 |
| Hydrophobic Treated Fumed Silica TS-720 | 0.65 | 0.10 |
| Hydrophobic Treated Precipitated Calcium Carbonate (Socal 322) | 25 | 3.72 |
| Hydrophobic Treated Ground Calcium Carbonate | 40 | 5.96 |
| Pigment | 6 | 0.89 |
| Dimethylbis-secondary butylaminosilane | 5.55 | 0.83 |
| Methyltris-methylethylketoximosilane | 19 | 2.83 |
| Aminoethylaminopropyltrimethoxysilane | 8.05 | 1.20 |
| TOTALS | 671.25 | 100.00 |

The dispersed copolymer polysiloxane composition of Example 16 was used to prepare the low modulus sealant composition from the above ingredients. First the fillers and reinforcing agents were incorporated into the dispersed copolymer polysiloxane composition of Example 16 under high shear mixing conditions and vacuum in a change can mixer, before the Santicizer 160 plasticizer was added. By first adding the fillers and reinforcing agents a maximum dispersion of the fillers was achieved.

The dispersed copolymer polysiloxane composition-filler mixture and plasticizer were then mixed under vacuum at 100±5° C. for two hours to remove moisture from the precipitated calcium carbonate and the ground calcium carbonate. This mixture was then cooled below 50° C., and then the moisture sensitive ingredients were added under dry nitrogen and mixed under vacuum for twenty minutes. Next the final sealant product was packaged.

Example 20

A sealant composition suitable for use as a caulk, was prepared as in example 19, except that the following ingredients were used.

| Material | Total Charge | Weight Percent |
|---|---|---|
| Example 16 copolymer-polydimethylsiloxane composition | 500 | 74.48 |
| Plasticizer-Santicizer 160 | 67 | 9.98 |
| Hydrophobic Treated Fumed Silica TS-720 | 0.65 | 0.10 |
| Hydrophobic Treated Precipitated Calcium Carbonate (Socal 322) | 25 | 3.72 |
| Hydrophobic Treated Ground Calcium Carbonate | 40 | 5.96 |
| Pigment | 6 | 0.89 |
| Dimethyl bis-secondary Butylaminosilane | 5.55 | 0.83 |
| Methyl tris-methylethylketoximosilane | 19 | 2.83 |
| Aminoethylaminopropyltrimethoxysilane | 8.05 | 1.20 |
| Dibutyltindilaurate | 0.05 | 0.01 |
| TOTALS | 671.30 | 100.00 |

Example 21

A sealant composition suitable for use as a caulk, was prepared as in example 19, except that the following ingredients were used.

| Material | Total Charge | Weight Percent |
|---|---|---|
| Example 16 copolymer-polydimethylsiloxane composition | 500 | 74.47 |
| Santicizer 160 | 67 | 9.98 |
| Hydrophobic Treated Fumed Silica TS-720 | 0.65 | 0.10 |
| Hydrophobic Treated Precipitated Calcium Carbonate (Socal 322) | 25 | 3.72 |
| Hydrophobic Treated Ground Calcium Carbonate | 40 | 5.96 |
| Pigment | 6 | 0.89 |
| Dimethyl bis-secondary Butylaminosilane (chain extender) | 5.55 | 0.83 |
| Methyl tris-methyl-Ethylketoximosilane (crosslinker) | 19 | 2.83 |
| Aminoethylaminopropyltrimethoxysilane (adhesion promoter) | 8.05 | 1.20 |
| Dibutyltindilaurate (catalyst) | 0.135 | 0.02 |
| TOTALS | 671.385 | 100.00 |

Example 22

A sealant composition suitable for use as a caulk, was prepared as in Example 19, except that the following ingredients were used in the amounts listed below.

| Input Material | Total Charge | Weight Percent |
|---|---|---|
| Example 16 (70-30 copolymer-polydimethylsiloxane) composition | 500 | 61.70 |
| Santicizer 160 | 160 | 19.74 |
| Hydrophobic Treated Precipitated Calcium Carbonate (Socal 322) | 22.5 | 2.78 |
| Hydrophobic Treated Ground Calcium Carbonate | 100 | 12.34 |
| Pigment (Titanium dioxide) | 5 | 0.62 |
| Methyl tris-methyl-Ethylketoximosilane (crosslinker) | 18 | 2.22 |
| Aminoethylaminopropyltrimethoxysilane (adhesion promoter) | 4.5 | 0.56 |
| Dibutyltindilaurate (catalyst) | 0.3 | 0.04 |
| TOTALS | 810.3 | 100.00 |

The sealants of examples 19–22 were evaluated without curing; the results are presented in Table V. Tooling life was measured using a round tip spatula at 25° C. and 50% humidity, according to Mil-S-8802, sag was measured according to the Boeing sag flow in Mil-S-8802; extrusion rate was measured according to ASTM D-2254; and tack free time was measured at according to the polyethylene release using a 25 gram weight according to Mil-S-8802. Examples 15–18 did not stain porous materials such as marble and are particularly desirable for use with such porous materials.

TABLE V

Properties of Uncured Sealants

| Example | Sag (inch) | Tooling Life (min) | Extrusion Rate (sec) | Tack Free Time (hours) |
|---|---|---|---|---|
| 19 | 0.1 | 165 | 45 | 7 |
| 20 | 0.1 | 75 | 35 | 3.2 |
| 21 | 0.1 | 25 | 35 | 1.5 |
| 22 | 0 | 5.0 | 86 | 50 (min) |

The sealants of examples 19–22 were coated, or more specifically drawn down, on a polyethylene sheets and cured at 25° C. and 50% relative humidity for 21 days. The materials were then released from the polyethylene and evaluated; shore A hardness was measured according to the Shore a Instrument test method according to in ASTM D-2240, tensile strength was measured using a Instron 20 inch/minute jaw separation rate according to ASTM D-412, modulus was measured using a Instron 20 inch/minute jaw separation rate according to ASTM D-412, and elongation was measured using Instron 20 inch/minute jaw separation rate according to ASTM D-412. The results are presented in Table VI.

TABLE VI

Properties of Cured Sealants

| Example | Shore A Hardness | Tensile Strength (psi) | 100% Modulus (psi) | Elongation % |
|---|---|---|---|---|
| 19 | 10 | 110 | 20 | 700 |
| 20 | 15 | 152 | 25 | 700 |
| 21 | 14 | 146 | 30 | 495 |
| 22 | 15 | 135 | 44 | 425 |

The sealant of Example 19–22 all demonstrated cohesive adhesion to glass, concrete limestone, marble and anodized aluminum substrates. No shrinkage was observed. Other suitable substrates for the sealants include, for example, plastic, particularly polyacrylate, and rigid PVC, painted surfaces, wood, metal, stone, brick and other masonry materials.

While in accordance with the Patent Statutes, the best mode and preferred embodiment has been set forth, the scope of the invention is not limited thereto, but rather by the scope of the attached claims.

What is claimed is:

1. An uncured copolymer-polysiloxane composition, comprising:
   copolymer particles derived from monomers comprising at least a low Tg polymer-forming monomer in an amount from about 60 to about 97.5% by weight, said low Tg being from about minus 70° C. to about 0° C., and at least a different high Tg polymer-forming monomer in an amount from about 2.5% to about 40% by weight based upon the total weight of said copolymer derived from said low Tg and said high Tg polymer-forming monomers, said high Tg being from about 5° C. to about 150° C., said copolymer particles being dispersed in reactive polysiloxane fluid; and
   wherein the composition has a viscosity increase of less than 100% at 20° C. after aging for 24 hours as measured by ASTM D2452-75.

2. An uncured copolymer-polysiloxane composition according to claim 1, wherein said monomers forming said copolymer particles are polymerized in the presence of said reactive polysiloxane fluid, and wherein the amount of said copolymer particles is from about 10 percent to about 85 percent by weight per 100 parts by weight of said polysiloxane fluid and said copolymer particles.

3. An uncured copolymer-polysiloxane composition according to claim 2, wherein said polysiloxane has the formula

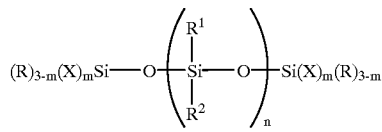

wherein $R^1$ and $R^2$, independently, is an alkyl having from 1 to 8 carbon atoms, an aromatic or an alkyl substituted aromatic having a total of from 6 to 10 carbon atoms, wherein n is such that the weight average molecular weight of the polysiloxane is from about 2,000 to about 200,000, wherein X, independently, is an OH group, or an $OR^3$ group, or an $N(R^4)_2$ group, or

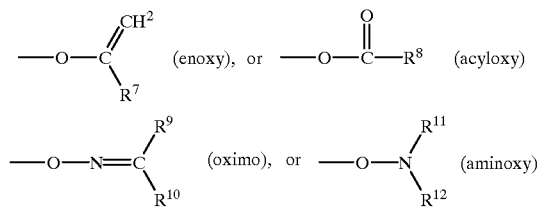

or an

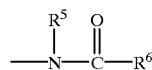

group, wherein $R^3$ through $R^{12}$, are, independently, an alkyl having from about 1 to about 8 carbon atoms, wherein each R group, independently, is an alkyl having from 1 to 8 carbon atoms or an aromatic or an alkyl-aromatic having from 6 to 20 carbon atoms and optionally containing one or more functional groups, and wherein m is 1, 2, or 3, and wherein said viscosity increase after aging at viscosity increase after aging at 20° C. for 24 hours is less than 50 percent.

4. An uncured copolymer-polysiloxane composition according to claim 3, wherein said low Tg polymer forming monomer is an alkyl acrylate wherein said alkyl group has from 1 to 8 carbon atoms, wherein said high Tg polymer forming monomer is a vinyl ester wherein the non-vinyl portion has from 2 to 10 carbon atoms, an acrylonitrile or an alkyl derivative thereof wherein said alkyl group has from 1 to 6 carbon atoms, a vinyl substituted aromatic having a total of from 8 to 12 carbon atoms, or an alkyl methacrylate wherein said alkyl group has from 1 to 8 carbon atoms, or combinations thereof.

5. An uncured copolymer-polysiloxane composition according to claim 4, wherein said low Tg polymer forming monomer comprises n-butyl acrylate, wherein said high Tg polymer forming monomer comprises said vinyl acetate, wherein the amount of said low Tg polymer forming monomer is from about 60% to about 80% by weight based upon the total amount by weight of said low Tg and said high Tg polymer forming monomers, and wherein said viscosity increase is less than 25% at 20° C. after aging for 24 hours, and wherein the amount of said copolymer particles is from about 50 to about 75 percent by weight.

6. An uncured copolymer-polysiloxane composition according to claim 1, including a thixotropic agent and optionally a compatibilizing agent.

7. An uncured copolymer-polysiloxane composition according to claim 4, including a thixotropic agent and a compatibilizing agent.

8. A copolymer-polysiloxane composition according to claim 1, wherein said copolymer particles are surface rich in said high Tg polymer, and wherein said composition is moisture cured.

9. A copolymer-polysiloxane composition according to claim 3, wherein said copolymer particles are surface rich in said high Tg polymer, wherein said composition is moisture cured, and wherein said composition has an elongation at break of at least 500 percent at 20° C.

10. A copolymer-polysiloxane composition according to claim 5, wherein said copolymer particles are surface rich in said high Tg polymer, and wherein said composition is moisture cured, and wherein said composition has an elongation at break of at least 500 percent at 20° C.

11. A polysiloxane composition, comprising:
a copolymer dispersed in a polysiloxane, said copolymer derived from monomers comprising at least a low Tg polymer-forming monomer, in an amount from about 60 percent to about 97.5 percent by weight based upon the total weight of all of said low and said high Tg polymer-forming monomers, said low Tg being from about minus 70° C. to about 0° C., and at least a different high Tg polymer-forming monomer, in an amount from about 2.5 to about 40 percent by weight of said low Tg and said high Tg polymer-forming monomers, said high Tg being from about 5° C. to about 150° C., said polysiloxane being cured and having an elongation at break of at least 300 percent at 20° C.

12. A polysiloxane composition according to claim 11, wherein said monomers forming said copolymer are polymerized in the presence of said polysiloxane, wherein said polysiloxane has the formula:

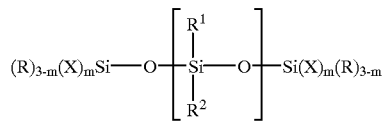

wherein $R^1$ and $R^2$, independently, is an alkyl having from 1 to 8 carbon atoms, an aromatic or an alkyl substituted aromatic having a total of from 6 to 10 carbon atoms, wherein n is such that the weight average molecular weight of the polysiloxane is from about 2,000 to about 200,000, wherein X, independently, is an OH group, or an $OR^3$ group, or an $N(R^4)_2$ group, or

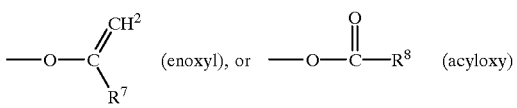

-continued

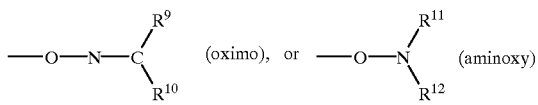

or an

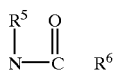

group, wherein $R^3$ through $R^{12}$, are, independently, an alkyl having from about 1 to about 8 carbon atoms, wherein each R group, independently, is an alkyl having from 1 to 8 carbon atoms or an aromatic or an alkyl-aromatic having from 6 to 20 carbon atoms and optionally containing one or more functional groups, and wherein m is 1, 2 or 3, wherein said low Tg is from about minus 70° C. to about 0° C., wherein said high Tg is from about 5° C. to about 150° C., wherein said low Tg polymer-forming monomer is an alkyl acrylate wherein said alkyl group has from 1 to 8 carbon atoms, and wherein said high Tg polymer-forming monomer is vinyl ester wherein the non-vinyl portion has from 2 to 10 carbon atoms, an acrylonitrile or an alkyl derivative thereof wherein said alkyl group has from 1 to 6 carbon atoms, or a vinyl substituted aromatic having a total of from 8 to 1 2 carbon atoms, or an alkyl methacrylate wherein said alkyl group has from 1 to 8 carbon atoms, or combinations thereof.

13. A polysiloxane composition according to claim 12, wherein said composition has a 100 percent tensile modulus of less than 50 psi, wherein the amount of said copolymer is from about 10 percent to about 85 percent by weight per 100 parts by weight of said polysiloxane and said copolymer, wherein said high Tg forming monomer comprises said vinyl ester, and wherein said composition has an elongation at break of at least 300 percent at 20° C.

14. A polysiloxane composition according to claim 11, including a thixotropic agent and optionally a compatibilizing agent, and wherein said copolymer is surface rich in said high Tg polymer.

15. A polysiloxane composition according to claim 13, including a thixotropic agent and a compatibilizing agent, wherein said vinyl ester is vinyl acetate, wherein the amount of said copolymer is from about 50 about 75 percent by weight polymerized in the presence of said polysiloxane, and wherein said copolymer is surface rich in said high Tg polymer.

16. A process for forming a polysiloxane composition, comprising the steps of:
free radically polymerizing monomers comprising low and high Tg polymer-forming monomers in the presence of a polysiloxane, wherein the amount of said low Tg polymer-forming monomers is from about 60 percent to about 97.5 percent of said total monomers, and the amount of said high Tg polymer-forming monomers is from about 2.5 to about 40% by weight, wherein said low Tg is from about minus 70° C. to about 0° C. and wherein said high Tg is from about 5° C. to about 150° C.

17. A process according to claim 16, wherein said polysiloxane composition when cured has at 20° C. an elongation at break of at least 300 percent, wherein said low Tg polymer forming monomer is an alkyl acrylate wherein said alkyl group has from 1 to 8 carbon atoms, and wherein said high Tg polymer forming monomer is a vinyl ester wherein the non-vinyl portion has from 2 to 10 carbon atoms, an acrylonitrile or an alkyl derivative thereof wherein said alkyl group has from 1 to 6 carbon atoms, a vinyl substituted aromatic having a total of from 8 to 12 carbon atoms, or an alkyl methacrylate wherein said alkyl group has from 1 to 8 carbon atoms, or combinations thereof.

18. A process according to claim 17, including adding a substantial amount by weight of a high Tg polymer forming monomer during a late polymerization stage or during a second or subsequent polymerization stage.

19. A process according to claim 18, wherein the amount of said low Tg polymer forming monomer is from about 60 to about 80 percent by weight, wherein the amount of said copolymer is from about 100 to about 400 parts by weight per 100 parts by weight of said polysiloxane, and wherein said elongation of said polysiloxane composition when cured is at least 300 percent.

20. A process according to claim 19, wherein said low Tg polymer forming monomer comprises n-butyl acrylate, and wherein said high Tg monomer comprises vinyl acetate.

21. A sealant, comprising:
from about 10 to about 85 percent by weight of a copolymer and from about 15 to about 90 percent by weight of a polysiloxane based upon the total weight of said copolymer and said polysiloxane, said copolymer derived from monomers comprising at least a low Tg polymer-forming monomer, in an amount from about 60 to about 97.5 percent by weight, said low Tg being from about minus 70° C. to about 0° C., and at least a different high Tg polymer-forming monomer, in an amount from about 2.5 to about 40 percent by weight, said weight percent of said low Tg polymer-forming monomer and said high Tg polymer-forming polymer as based upon the total weight of said copolymer derived from said low Tg and said high Tg polymer-forming monomers, said high Tg being from about 5° C. to about 150° C.; and
based upon 100 parts by weight of said copolymer-polysiloxane,
from 0 to 15 parts by weight of an adhesion promoter;
from about 0.2 to about 100 parts by weight of a crosslinker;
from about 0 to about 100 parts by weight of a reinforcing agent;
from 0 to 80 parts by weight of a plasticizer; and
from about 0 to about 12 parts by weight of a chain extender.

22. The sealant of claim 21, wherein the sealant when cured has an elongation at break of from about 250 to about 1,600%.

23. The sealant of claim 22, wherein the chain extender is present from about 0.2 percent to about 12 parts by weight.

24. The sealant composition of claim 23, wherein the reinforcing agent is present from about 0.1 to about 100 parts by weight, the plasticizer is present from about 5 to about 80 parts by weight, and wherein said elongation is from about 350 to about 1,400 percent.

25. The sealant of claim 24, wherein the plasticizer is present from about 8 to 50 parts by weight, the reinforcing agent is present from about 0.1 to about 60 parts by weight, and the chain extender is present from about 0.2 to about 8 parts by weight.

26. The sealant of claim 24, wherein the plasticizer is a phthalate ester of butyl alcohol and benzyl alcohol the chain extender is dimethyl bis-secondary butylaminosilane, and the crosslinker is an oxime crosslinker.

27. The sealant of claim 21, wherein there is: from about 0.75 to about 6 parts by weight of the adhesion promoter;
from about 1 to 10 parts by weight of the cross linker;
from about 0.1 to 60 parts by weight of the reinforcing agent;
from about 8 to 50 parts by weight of the plasticizer; and
from about 0.2 to about 8 parts by weight of the chain extender.

28. The sealant of claim 27, wherein the plasticizer is a phthalate ester of butyl alcohol and benzyl alcohol, the chain extender is bis-secondary butylaminosilane, the crosslinker is an oxime crosslinker, and the copolymer-polysiloxane composition is a low Tg polymer-forming monomer comprising n-butylacrylate and a high Tg polymer-forming monomer comprising vinyl acetate, wherein the amount of said low Tg polymer-forming monomer is from about 60% to about 80% based upon the total amount by weight of said low Tg and said high Tg polymer-forming monomers.

29. The sealant of claim 27, wherein the plasticizer is a phthalate ester of butyl alcohol and benzyl alcohol, the chain extender is dimethyl bis-secondary butylaminosilane, the crosslinker is an oxime crosslinker, the adhesion promoter is aminopropyltriethoxysilane or aminopropyltrimethoxysilane, and the copolymer-polysiloxane composition is a low Tg polymer-forming monomer comprising n-butylacrylate and a high Tg polymer-forming monomer comprising vinyl acetate, wherein the amount of said low Tg polymer-forming monomer is from about 60% to about 80% based upon the total amount by weight of said low Tg and said high Tg polymer-forming monomers.

30. The sealant of claim 21, wherein the sealant has a tool life of from about 20 to about 150 minutes.

31. The sealant of claim 24, wherein the dispersed copolymer-polysiloxane composition comprises about 70 percent of said copolymer and about 30 percent of said polysiloxane; wherein said plasticizer comprises butyl benzyl phthalate; wherein said reinforcing agent comprises hydrophobic treated fumed silica or hydrophobic treated precipitated calcium carbonate; wherein said chain extender comprises dimethyl bis-secondary butylaminosilane; wherein said crosslinker comprises methyl tris-methylethylketoximosilane; and wherein said adhesion promoter is comprised of aminopropyltrimethoxysilane.

32. The sealant of claim 31, wherein said catalyst is dibutyltin dilaurate.

33. The sealant of claim 21, having less than about a 1.0 inch sag, and a tooling life of at least about 5 minutes.

34. The sealant of claim 21, having less than about a 0.5 inch sag measured according to the Boeing sag is flow in Mil-S-8802, and a tooling life of at least about 10 minutes measured using a round tip spatula at 25° C. and 50% humidity according to Mil-S-8802.

35. The sealant of claim 21, wherein said sealant when cured has a tack free time of less than about 12 hours measured according to the polyethylene release method using a 25 gram weight according to Mil-S-8802.

36. The sealant of claim 21, wherein the sealant when cured has a Shore A hardness measured according to the Shore A Instrument test method of ASTM D-2240 of at least about 3, a tensile strength from about 20 to 400 psi as measured using a Instron 20 inch/minute jaw separation rate according to ASTM D-412, an elongation at break of at least about 250 percent as measured using Instron 20 inch/minute jaw separation rate according to ASTM D-412, and an extension modulus at 100% elongation of least about 8 psi measured using a Instron 20 inch/minute jaw separation rate according to ASTM D-412.

37. The sealant of claim 21, wherein the sealant when cured has: a shore A hardness at least about 10 as measured according to the Shore A Instrument test method of ASTM D-2240; a tensile strength of at least about 50 psi as measured using a Instron 20 inch/minute jaw separation rate according to ASTM D-412, an elongation of at least 350 percent as measured using an Instron 20 inch/minute jaw separation rate according to ASTM D-412; and a extension modulus at 100% elongation of less than about 50 psi as measured using a Instron 20 inch/minute jaw separation rate according to ASTM D-412.

38. A sealant coated substrate, comprising:
a substrate,
a cured sealant coated on the substrate, said cured sealant comprising:
polymeric particles comprising polymerized monomeric units of high Tg in an amount from about 2.5% to about 40% by weight based upon the total weight of said polymeric particles derived from a low Tg and said high Tg polymerized monomeric units and polymerized monomeric units having said low Tg in an amount from about 60% to about 97.5% by weight based upon the total weight of said polymeric particles derived from said low Tg and said high Tg polymerized monomeric units;
polysiloxane; and
crosslinkers linking the polymeric particles.

* * * * *

UNITED STATES PATENT AND TRADEMARK OFFICE
CERTIFICATE OF CORRECTION

PATENT NO.   : 6,403,711 B1
DATED        : June 11, 2002
INVENTOR(S)  : Wei-Yeih Yang et al.

It is certified that error appears in the above-identified patent and that said Letters Patent is hereby corrected as shown below:

Column 23,
Line 10, replace the formula:
"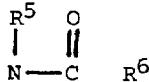"

with

-- 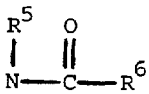 --

Signed and Sealed this

Twenty-second Day of July, 2003

JAMES E. ROGAN
*Director of the United States Patent and Trademark Office*